United States Patent
Moniz et al.

(10) Patent No.: US 10,935,943 B2
(45) Date of Patent: Mar. 2, 2021

(54) COMBINING HOME AUTOMATION AND UAV TECHNOLOGY

(71) Applicant: INTERNATIONAL BUSINESS MACHINES CORPORATION, Armonk, NY (US)

(72) Inventors: Ryan Moniz, Mountain House, CA (US); Alex X. Casella, Cambridge, MA (US); Harini Jagannathan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/058,006

(22) Filed: Aug. 8, 2018

(65) Prior Publication Data
US 2020/0050156 A1 Feb. 13, 2020

(51) Int. Cl.
*G05B 15/02* (2006.01)
*H04L 12/28* (2006.01)
*G06N 3/00* (2006.01)

(52) U.S. Cl.
CPC ............ *G05B 15/02* (2013.01); *G06N 3/006* (2013.01); *H04L 12/2816* (2013.01); *G05B 2219/163* (2013.01); *G05B 2219/2642* (2013.01)

(58) Field of Classification Search
CPC ............ G05B 15/02; G05B 2219/163; G05B 2219/2642; G06N 3/006; H04L 12/2816
See application file for complete search history.

(56) References Cited

U.S. PATENT DOCUMENTS

| | | | |
|---|---|---|---|
| 6,236,622 B1 | 5/2001 | Blackman | |
| 6,238,061 B1 | 5/2001 | McKenzie et al. | |
| 9,471,059 B1 | 10/2016 | Wilkins | |
| 9,600,645 B2 | 3/2017 | Fadell et al. | |
| 10,380,875 B1* | 8/2019 | Roberts | G06F 3/011 |
| 2004/0090311 A1* | 5/2004 | Schwartz | G04G 13/021 340/309.3 |
| 2006/0026277 A1* | 2/2006 | Sutcliffe | H04M 1/57 709/224 |
| 2014/0377130 A1* | 12/2014 | Edwards | G05B 15/02 422/5 |

(Continued)

FOREIGN PATENT DOCUMENTS

WO 9506302 A1 3/1995

OTHER PUBLICATIONS

Kalish, Alyse, "20 Better Ways to Wake Up in the Morning That Don't Involve Your Phone's Default Alarm", The Muse, Jun. 17, 2017 accessed via Wayback Machine from <<www.themuse.com/advice/20-better-ways-to-wake-up-in-the-morning-that-dontinvolve-your-phones-default-alarm>> on Feb. 3, 2019 (Year: 2017).*

(Continued)

*Primary Examiner* — Michael J Huntley
(74) *Attorney, Agent, or Firm* — Erik K. Johnson (57) ABSTRACT

According to one embodiment, a method, computer system, and computer program product for utilizing home automation technology and networked devices to wake up users is provided. The present invention may include targeting a user with one or more sensory effects, based on a plurality of user configuration data from one or more remote devices, wherein the remote devices are devices connected with a home automation network capable of producing one or more sensory effects; and determining whether the user has acknowledged wakefulness.

20 Claims, 5 Drawing Sheets

(56) References Cited

U.S. PATENT DOCUMENTS

| | | | |
|---|---|---|---|
| 2015/0109104 A1* | 4/2015 | Fadell | G08B 27/003 |
| | | | 340/5.65 |
| 2017/0092109 A1* | 3/2017 | Trundle | B64D 47/04 |
| 2017/0205827 A1 | 7/2017 | Rezvani | |
| 2017/0364828 A1 | 12/2017 | Bennett et al. | |
| 2018/0059625 A1* | 3/2018 | Yang | A61B 5/681 |
| 2018/0082682 A1 | 3/2018 | Erickson et al. | |
| 2018/0144615 A1* | 5/2018 | Kinney | G08B 29/02 |
| 2018/0165504 A1* | 6/2018 | Kerzner | G08B 13/1965 |

OTHER PUBLICATIONS

Skwarecki, "This Evil Alarm Clock App is the Only Reason I'm Awake Right Now", Lifehacker.com, Mar. 27, 2017 (accessed from <<https://lifehacker.com/this-evil-alarm-clock-app-is-the-only-reason-i-m-awake-1793682623>> on Sep. 15, 2020). (Year: 2017).*

Mell et al., "The NIST Definition of Cloud Computing", Recommendations of the National Institute of Standards and Technology, NIST Special Publication 800-145, Sep. 2011, 7 pages.

Zartman, "Alarm.com to Develop Drone Applications for Smart Home and Business Security", Jan. 3, 2017, 2 pages, http://www.alarm.com/about/press/PressGeneric.aspx?cmid=410.

Amazon, "Tech Tools Flying Alarm Clock", printed on Jul. 30, 2018, 5 apages, https://www.amazon.com/Tech-Tools-Flying-Alarm-Clock/dp/B0019CJANG.

Bellman & Symfon, "Hear your phone through walls", printed Jul. 30, 2018, 8 pages, https://bellman.com/en/our-solutions/mobile-phone-alert/.

Goggle Play, "Flash Alarm", printed on Jul. 30, 2018, 4 pages, https://play.google.com/store/apps/details?id=com.manzy.alarmflash&hl=en.

Nill, Ohgizmo, "Sony Rolly Will Roll, Dance and Shimmer", Sep. 11, 2007, 2 pages, http://www.ohgizmo.com/2007/09/11/sony-rolly-will-roll-dance-and-shimmer/.

* cited by examiner

FIG. 5

COMBINING HOME AUTOMATION AND UAV TECHNOLOGY

BACKGROUND

The present invention relates, generally, to the field of computing, and more particularly to home automation systems.

Home automation is the field concerned with the automatic centralized control of various systems within a home, such as security, lighting, heating, ventilation, and air conditioning, as well as appliances and entertainment devices. A home automation system typically connects the various subsystems of the home within a central hub, or gateway, which allows a user to control the systems using mobile devices, desktop computers, wall-mounted terminals, or even from offsite via online web interfaces. A home automation system may also include any number of "smart" devices, or devices capable of being hooked into a network within the home and controlled from a central hub. Home automation has taken off in recent years, with various personal assistants and home automation hubs being rolled out to consumers, making home automation and voice-based interfacing cheap and accessible. As such, now more than ever, home automation technology can be harnessed to solve common household problems.

SUMMARY

According to one embodiment, a method, computer system, and computer program product for utilizing home automation technology and networked devices to wake up users is provided. The present invention may include targeting a user with one or more sensory effects, based on a plurality of user configuration data from one or more remote devices, wherein the remote devices are devices connected with a home automation network capable of producing one or more sensory effects; and determining whether the user has acknowledged wakefulness.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to home automation. The following described exemplary embodiments provide a system, method, and program product to, among other things, utilize home automation technology and networked devices to wake up users. Therefore, the present embodiment has the capacity to improve the technical field of home automation by, in a broad sense, providing a method for utilizing sensors integrated into devices connected within a home automation network to support functionalities of other devices within the home automation network. In a narrower sense, the present embodiment improves the technical field of home automation by leveraging the conventional functionality of smart home devices and drone technology to provide a new functionality as an alarm, where such functionality is not necessarily traditionally provided by the smart home device or drone. The alarm functionality thereby provided represents a smart, multi-pronged and comprehensive solution to the age-old problem of failing to wake up, and may be varied such that a user cannot become acclimated to the alarm and sleep through it.

As previously described, home automation is the field concerned with the automatic centralized control of various systems within a home, such as security, lighting, heating, ventilation, and air conditioning, as well as appliances and entertainment devices. A home automation system typically connects the various subsystems of the home within a central hub, or gateway, which allows a user to control the systems using mobile devices, desktop computers, wall-mounted terminals, or even from offsite via online web interfaces. Home automation has taken off in recent years, with various personal assistants and home automation hubs being rolled out to consumers, making home automation and voice-based interfacing cheap and accessible. As such, now more than ever, home automation technology can be harnessed to solve common household problems.

Waking up in the morning at a time when one would prefer to remain asleep is a nearly universal and age-old constant of the human experience. Equally timeless and almost as widespread is the problem of failing to wake up in the morning at an appropriate time. For many, this problem has been addressed by traditional alarm clocks, or alarms set on mobile devices. However, for many others, such solutions are not effective, or lose effectiveness over time as users acclimate, such as by adapting to sleep through loud sounds, or by learning to disable the alarm without truly waking up. The advent of widely available home automation technology allows for new solutions to the problem of sleeping through alarms. As such, it may be advantageous to, among other things, implement a system that utilizes various technologies capable of being integrated into a home automation network, such as drones and smart appliances, to produce a multi-pronged sensory effect on a sleeping user, thereby ensure that the user cannot remain asleep.

According to one embodiment, the invention may be an alarm system that utilizes home automation devices, such as sensors, smart appliances, drones, and other devices connected to a home automation network to perform the function of an alarm clock by utilizing a device or combination of devices to create a variety of sensory effects which are difficult to ignore and difficult to disable without fully waking. The alarm system may also include or be in communication with sensors for verifying whether a user has awoken or merely returned to sleep.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize home automation technology and networked devices to wake up users.

Figure 1:
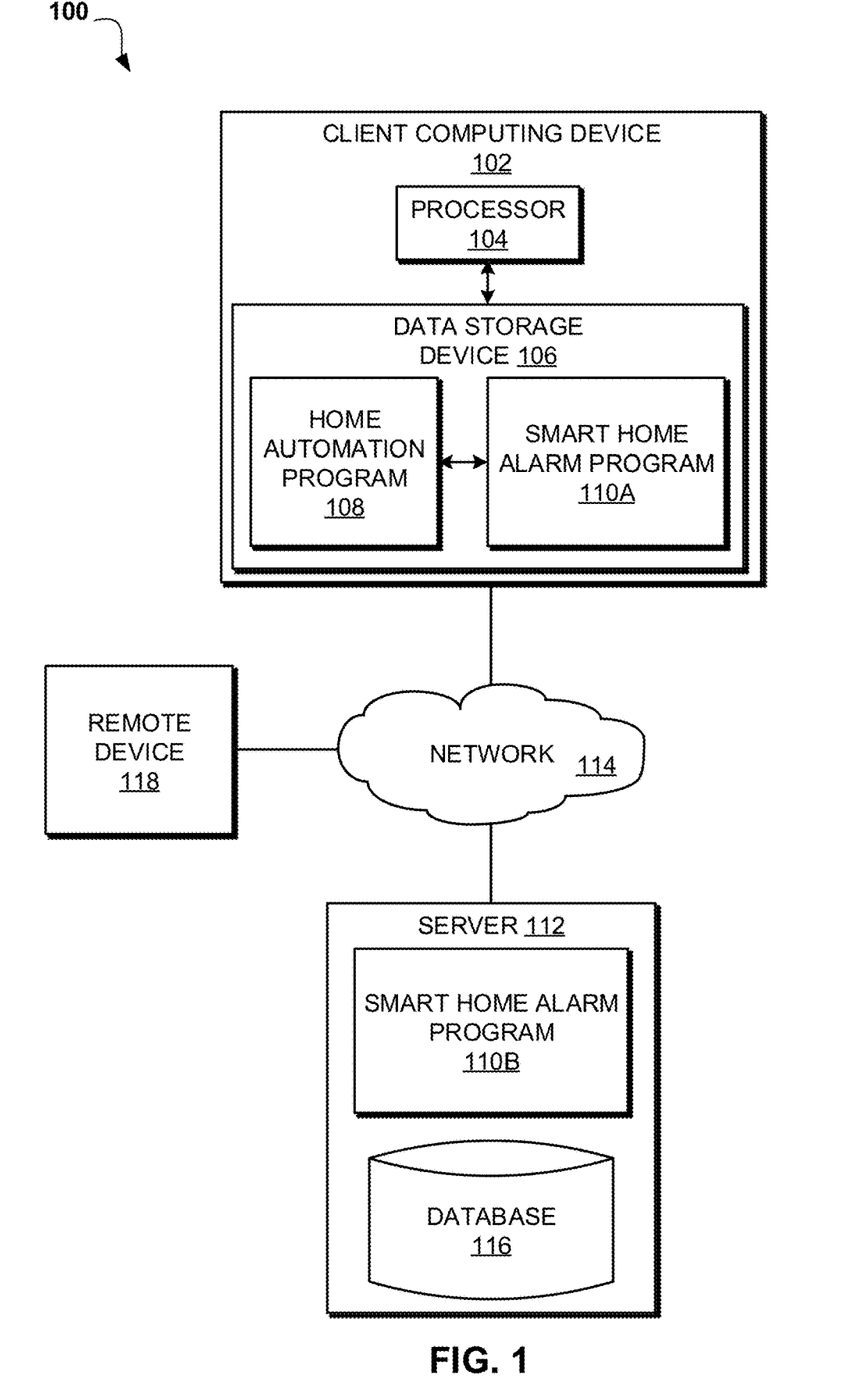
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a home automation program 108 and a smart home alarm program 110A and communicate with the server 112 via the communication network 114, in accordance with one embodiment of the invention. Client computing device 102 may be, for example, a mobile device, a telephone, a home automation terminal, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a smart home alarm program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be in a cloud computing deployment model, such as a private cloud, community cloud, public cloud, or hybrid cloud.

Home automation program 108 may be any program in communication with and capable of issuing commands to or receiving input from one or more remote devices 118 over network 114. Examples may include voice-based virtual home assistants, such as Google Home® (Google Home® and all Google Home®-based trademarks and logos are trademarks or registered trademarks of Google Inc. and/or its affiliates) and the Amazon Echo® (Amazon Echo® and all Amazon Echo®-based trademarks and logos are trademarks or registered trademarks of Amazon Technologies, Inc. and/or its affiliates). Another example may include a smart home hub, such as the SmartThings® Hub (SmartThings® and all SmartThings®-based trademarks and logos are trademarks or registered trademarks of Samsung Electronics Co. Ltd. and/or its affiliates).

Remote device 118 may be any device in communication with smart home alarm program 110A, 110B and/or home automation program 108 via network 114 and capable of producing sensory effects on a user, where a sensory effect is any stimulus that could rouse a user from sleep. Remote device 118 may be, for example, a network-enabled appliance such as a smart television, smart thermostat, smart sound system, etc. In some embodiments of the invention, remote device 118 may also be any device capable of sensing a user, such as via camera, microphone, sonar, weight sensor, door sensor, gyroscope, etc. In one embodiment of the invention, remote device 118 may be a network-enabled drone, which may be a land-mobile or flight-capable vehicle that is wirelessly controlled, for moving around a user's room. The drone may include a main body with integrated user interface elements for adjusting settings, strobe lights that give wide-angle coverage and may be capable of producing a strobe effect, and speakers capable of broadcasting various sounds (for instance, a tyrannosaurus rex roaring, a jet engine running, train horns blowing, rain, music, thunder, etc.). The drone may be further equipped with or communicable with a video camera or other sensors, which may be capable of identifying a figure and may be further capable of determining whether a figure is awake or asleep. In embodiments where the drone is equipped with one or more sensors, the drone may be further equipped with a device for sprinkling water upon a user.

According to the present embodiment, the smart home alarm program 110A, 110B may be a program capable of utilize home automation technology and networked devices to wake up users. The smart home alarm program 110A, 110B may be a discrete program or a subroutine or method integrated into home automation program 108. The smart home alarm program 110A, 110B may be located on client computing device 102 or server 112 or on any other device located within network 114. Furthermore, smart home alarm program 110A, 110B may be distributed in its operation over multiple devices, such as client computing device 102 and server 112. The smart home alarm method is explained in further detail below with respect to FIG. 2.

Figure 2:
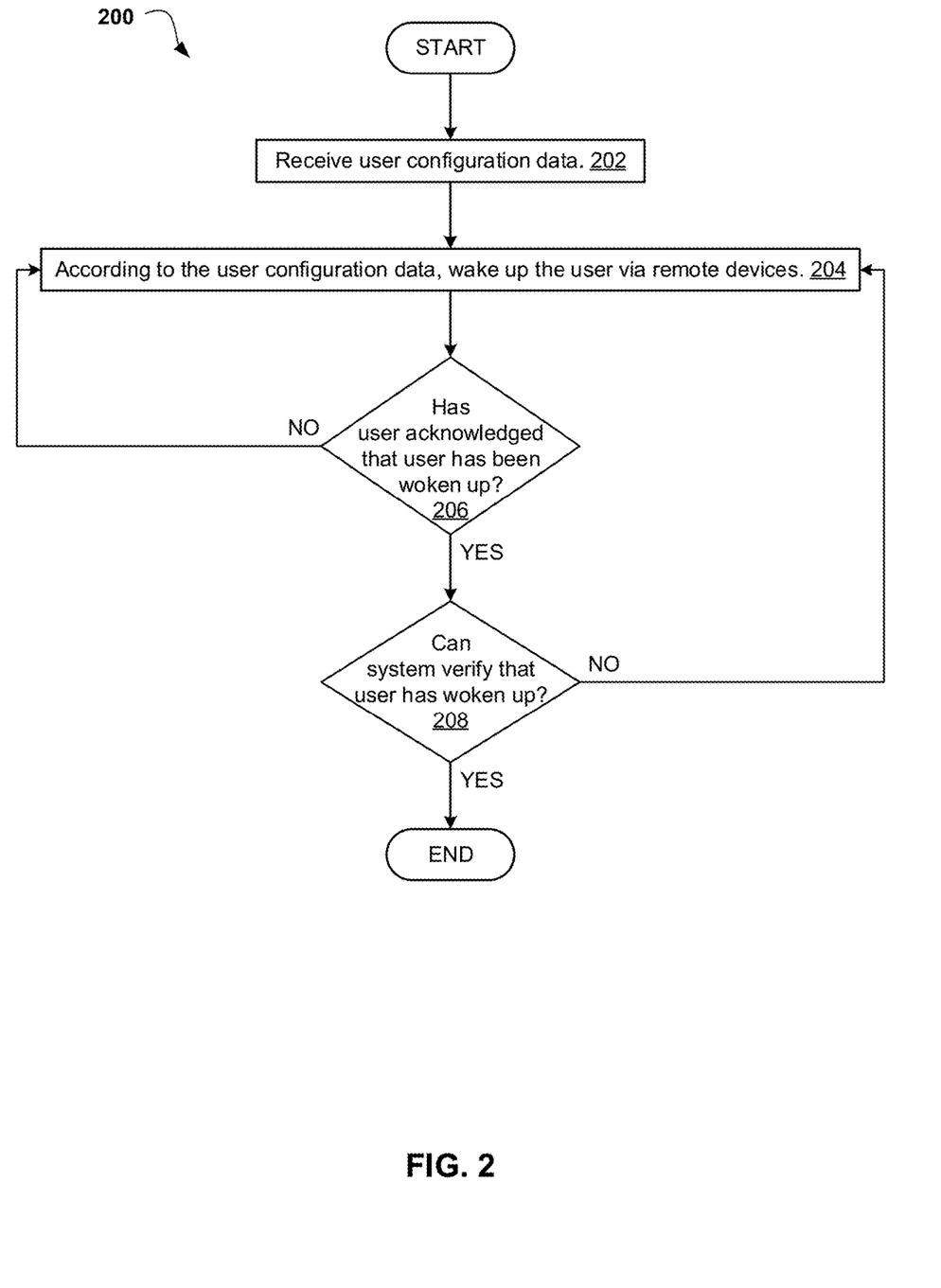
FIG. 2 is an operational flowchart illustrating a smart home alarm process according to at least one embodiment.

Referring now to FIG. 2, an operational flowchart illustrating a smart home alarm process 200 is depicted according to at least one embodiment. At 202, the smart home alarm program 110A, 110B receives user configuration data. The user configuration data may include a date and time when a user wishes smart home alarm program 110A, 110B to awaken her, as well as the combination of remote devices 118 and the combination of sensory effects (e.g. loud sounds, bright lights, water sprinkling, etc.) with which the user wishes smart home alarm program 110A, 110B to awaken her. For instance, the user with an important exam the next morning may specify that she wants her network-enabled TV in her bedroom to play a video of cats, that she wants her smart speaker to play loud music, and that she wants a drone to hover over her and sprinkle water on her. The user may further specify the duration of the alarm, the loudness of the sounds, the video, and other such details. In some embodiments of the invention, smart home alarm program 110A, 110B may employ a random combination of remote devices 118 and/or a random combination of sensory effects in awakening the user.

Next, at 204, the smart home alarm program 110A, 110B, according to the user configuration data, wakes up the user via remote device 118. The smart home alarm program 110A, 110B may contain an internal clock/calendar or may receive date and time information from home automation program 108 or another database, program or service connected to network 114. In some embodiments, smart home alarm program 110A, 110B may receive a user's calendar and may automatically wake up the user for calendar events, and may draw traffic and map information from a service, database, or program in connection with network 114 to estimate a travel time it would take to navigate to the location of a calendar event and factor this into the time at which smart home alarm program 110A, 110B engages the alarm functionality. The smart home alarm program 110A, 110B may also prompt the user to set an alarm. Upon engaging the alarm, smart home alarm program 110A, 110B may utilize the specified devices and methods to wake up the user, such as by activating a television, launching a drone to sprinkle water, and playing music. In some embodiments where smart home alarm program 110A, 110B is not in direct communication with remote device 118, smart home alarm program 110A, 110B may send instructions to home automation program 108 to engage the specified devices and functionalities of one or more remote devices 118.

Next, at 206, the smart home alarm program 110A, 110B determines whether the user has acknowledged that the user has been woken up. The smart home alarm program 110A, 110B determines whether the user has acknowledged that the user has woken up by, for example, sending a prompt and waiting for a response. The prompt may be a text-based prompt sent, for example, to a user's mobile device, asking the user to press a button, swipe, enter a password, or otherwise interact with the mobile device to disarm or snooze smart home alarm program 110A, 110B. The prompt may also be an auditory prompt voiced aloud, to which the user might respond with a password or phrase. In some embodiments, there may be no prompt, but the user may express acknowledgement by interacting with the alarm system, such as by catching a flying or rolling drone and reseating it on a base or charger port, by pressing a button or flipping a switch or otherwise interacting with a physical device to signify that the user has woken up. According to one implementation, if the user does not acknowledge that the user has been woken up (step 206, "NO" branch), the smart home alarm program 110A, 110B may continue to step 204 to, according to the user configuration data, wake up the user via remote devices. If the smart home alarm program 110A, 110B determines that the user has acknowledged that the user has been woken up (step 206, "YES" branch), the smart home alarm program 110A, 110B may continue to step 210 to verify that the user has woken up.

Then, at 208, the smart home alarm program 110A, 110B verifies that the user has woken up. The smart home alarm program 110A, 110B may verify that the user has woken up by receiving information from one or more sensors indicating that the user is moving, is no longer in bed, or is otherwise demonstrating wakefulness. The smart home alarm program 110A, 110B may utilize any number of sensors and means to infer wakefulness; for example, smart home alarm program 110A, 110B may use bed-mounted weight sensors or sonar (e.g. flying-drone-based) to determine if a user has left the bed, may use cameras, a gyroscope or position sensors in a mobile device, motion detectors, etc. to determine if the user is moving, or may use the operation of smart home devices such as remote devices 118 connected to network 114 (such as door sensors, operation of smart toaster or coffee machine, etc) to infer and verify wakefulness. This step is to ensure that a user does not fall back to sleep after acknowledging wakefulness to the system, as well as to ensure that a user does not learn to acknowledge wakefulness without truly waking up. According to one implementation, if the smart home alarm program 110A, 110B verifies that the user has not woken up, or cannot verify that the user has woken up (step 210, "NO" branch), the smart home alarm program 110A, 110B may continue to step 204 to, according to the user configuration data, wake up the user via remote devices. If the smart home alarm program 110A, 110B verifies that the user has woken up (step 212, "YES" branch), the smart home alarm program 110A, 110B may terminate.

It may be appreciated that FIG. 2 provides only an illustration of one implementation and does not imply any limitations with regard to how different embodiments may be implemented. Many modifications to the depicted environments may be made based on design and implementation requirements. For example, in other embodiments of the invention, the devices and/or sensory effects employed in waking up the user may be increased in number and intensity until a user acknowledges wakefulness, or until smart home alarm program 110A, 110B verifies that the user has woken up.

Figure 3:
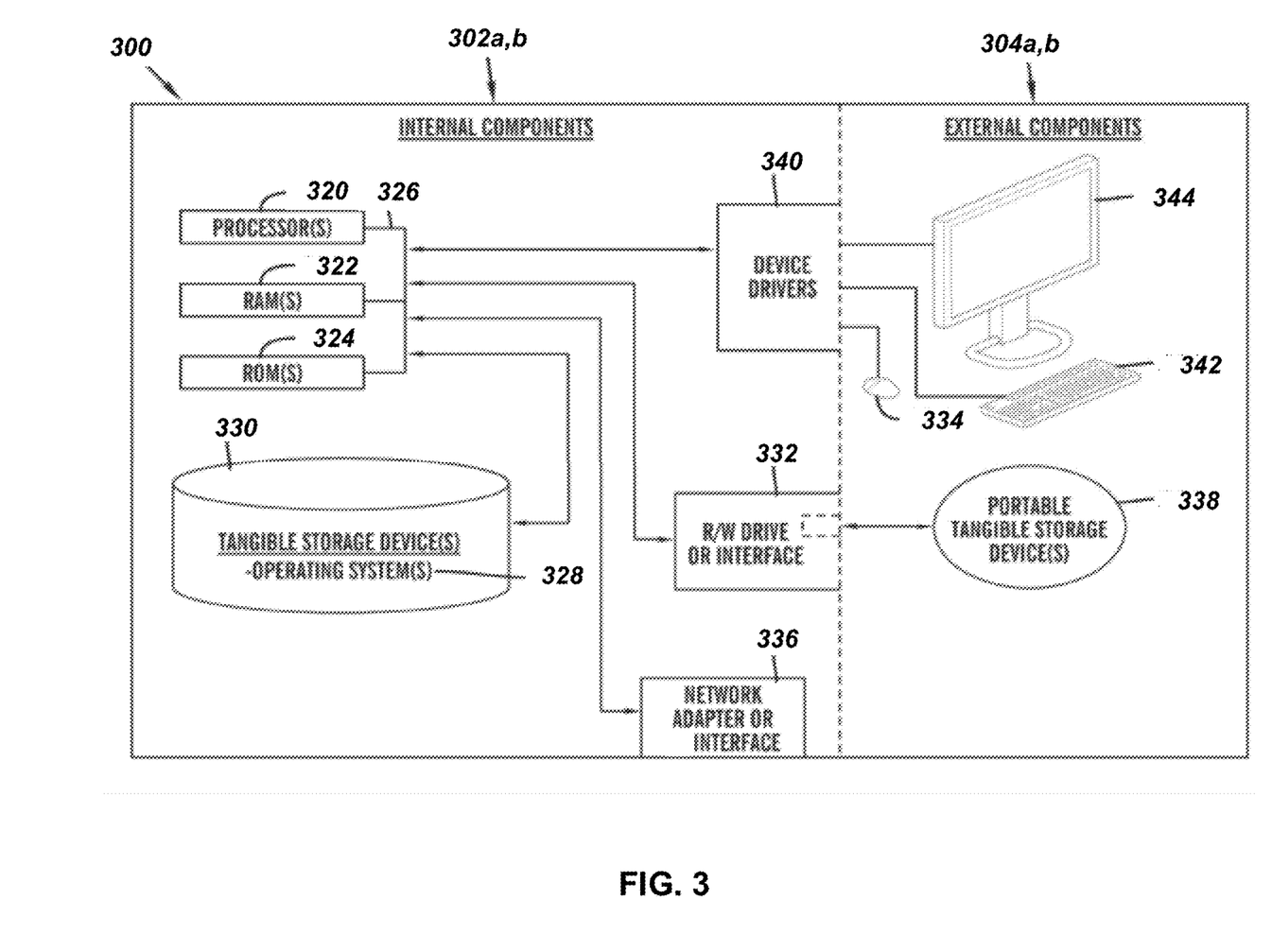
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the home automation program 108 and the smart home alarm program 110A in the client computing device 102, and the smart home alarm program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the smart home alarm program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The home automation program 108 and the smart home alarm program 110A in the client computing device 102 and the smart home alarm program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the home automation program 108 and the smart home alarm program 110A in the client computing device 102 and the smart home alarm program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
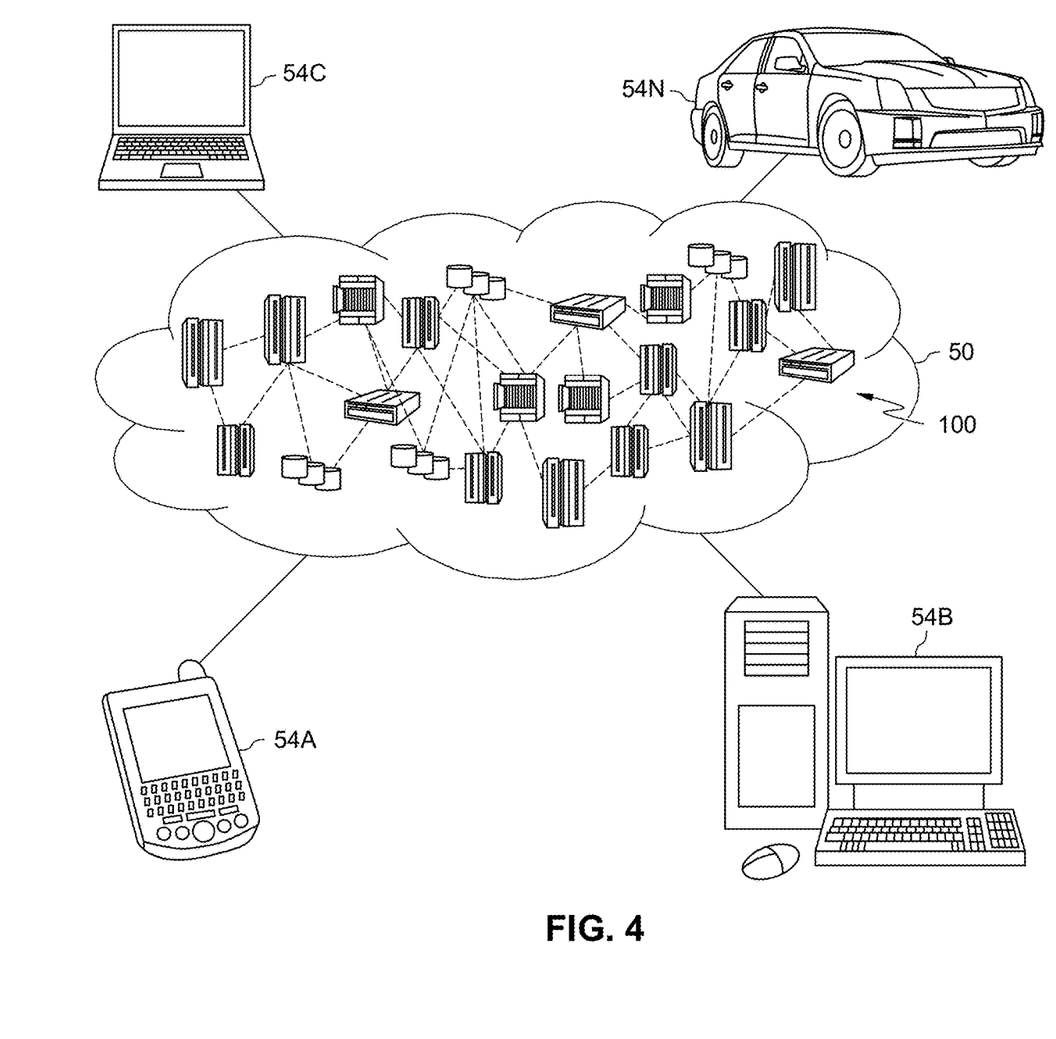
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
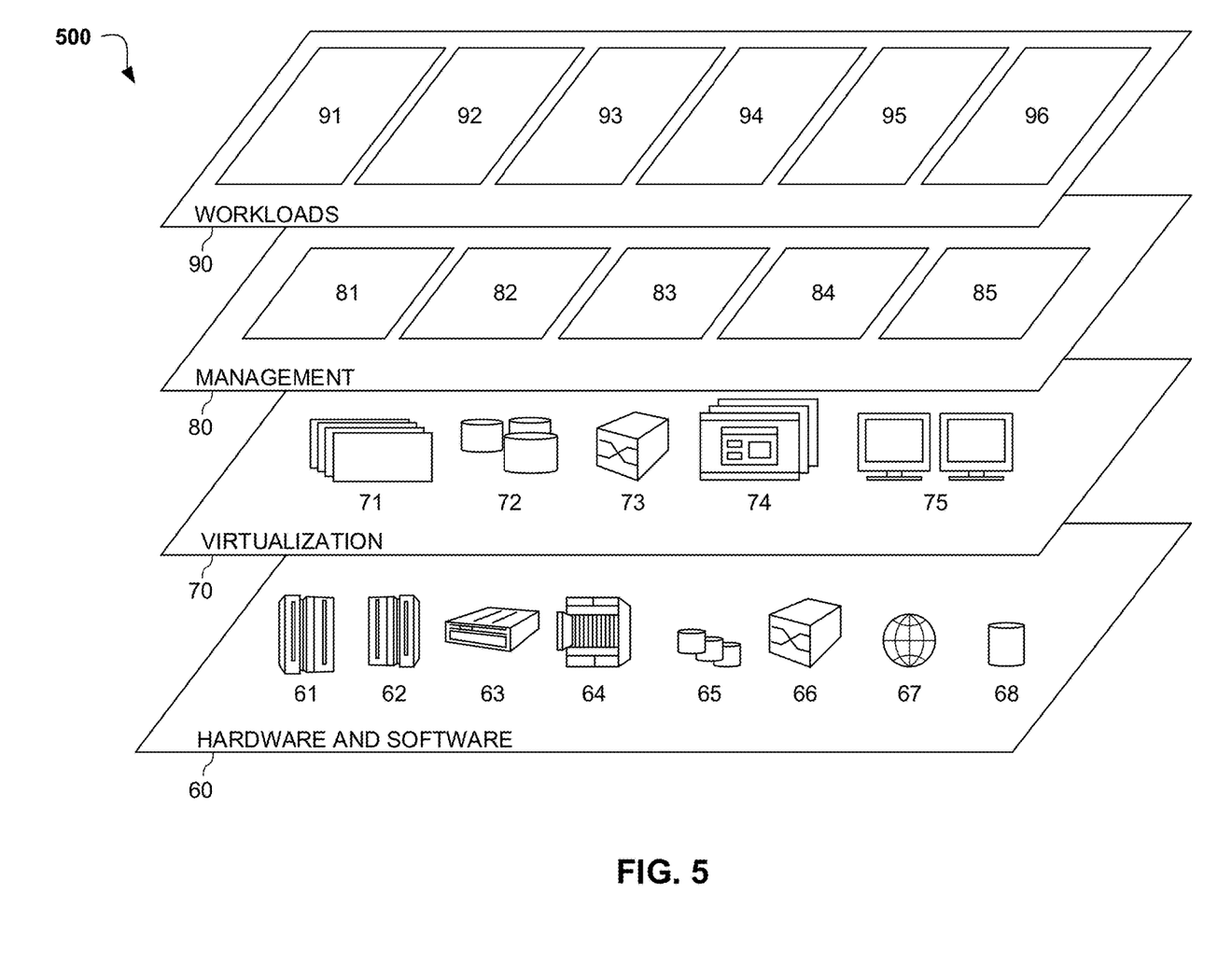
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and smart home alarm 96. Smart home alarm 96 may relate to utilizing home automation technology and networked devices to wake up users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for utilizing home automation technology to awaken a user, the method comprising:
    based on a plurality of user configuration data, targeting a user with one or more sensory effects from two or more remote devices, wherein the remote devices are devices connected with a home automation network capable of producing one or more sensory effects;
    determining whether the user has acknowledged wakefulness, wherein determining the user has acknowledged wakefulness comprises:
        providing a prompt to the user; and
        receiving an appropriate response from the user to the prompt; and
    verifying that the user has woken up.

2. The method of claim 1, further comprising:
    verifying that the user has awoken using one or more user interactions with one or more devices within the home automation network.

3. The method of claim 1, wherein the user configuration data comprises one or more calendar events, and the method further comprises:
    targeting the user based on the one or more calendar events and an estimated travel time to a location of the one or more calendar events.

4. The method of claim 1, wherein targeting the user is accomplished using one or more random sensory effects or a random selection of remote devices.

5. The method of claim 1, wherein the one or more sensory effects from the two or more remote devices increase in number or intensity over time.

6. The method of claim 1, wherein the user information enumerates the-two or more remote devices and the one or more sensory effects used to target the user.

7. The method of claim 1, wherein the prompt comprises a text based prompt to enter a password, and wherein the response is the password of the user.

8. A computer system for utilizing home automation technology to awaken a user, the computer system comprising:
    one or more processors, one or more computer-readable memories, one or more mobile devices, one or more computer-readable tangible storage medium, and program instructions stored on at least one of the one or more tangible storage medium for execution by at least one of the one or more processors via at least one of the one or more memories, wherein the computer system is capable of performing a method comprising:

based on a plurality of user configuration data, targeting the user with one or more sensory effects from two or more remote devices, wherein the remote devices are devices connected with a home automation network capable of producing the one or more sensory effects;

determining whether the user has acknowledged wakefulness, wherein determining the user has acknowledged wakefulness comprises:

providing a prompt to the user; and         receiving an appropriate response from the user to the prompt; and     verifying that the user has woken up.

9. The computer system of claim 8, further comprising:
verifying that the user has awoken using input from one or more sensors connected with the home automation network.

10. The computer system of claim 8, further comprising:
verifying that the user has awoken using one or more user interactions with one or more devices within the home automation network.

11. The computer system of claim 8, wherein the user configuration data comprises one or more calendar events, and the method further comprises:
targeting the user based on the one or more calendar events and an estimated travel time to a location of the one or more calendar events.

12. The computer system of claim 8, wherein targeting the user is accomplished using one or more random sensory effects or a random selection of remote devices.

13. The computer system of claim 8, wherein the one or more sensory effects from the two or more remote devices increase in number or intensity over time.

14. The method of claim 8, wherein the user information enumerates the-two or more remote devices and the one or more sensory effects used to target the user.

15. A computer program product for utilizing home automation technology to awaken a user, the computer program product comprising:

one or more computer-readable tangible storage medium and program instructions stored on at least one of the one or more tangible storage medium, the program instructions executable by a processor to cause the processor to perform a method comprising:

based on a plurality of user configuration data, targeting the user with one or more sensory effects from two or more remote devices, wherein the remote devices are devices connected with a home automation network capable of producing one or more sensory effects;

determining whether the user has acknowledged wakefulness, wherein determining the user has acknowledged wakefulness comprises:

providing a prompt to the user; and             receiving an appropriate response from the user to the prompt and         verifying that the user has woken up.

16. The computer program product of claim 15, further comprising:
verifying that the user has awoken using input from one or more sensors connected with the home automation network.

17. The computer program product of claim 15, further comprising:
verifying that the user has awoken using one or more user interactions with one or more devices within the home automation network.

18. The computer program product of claim 15, wherein the user configuration data comprises one or more calendar events, and the method further comprises:
targeting the user based on the one or more calendar events and an estimated travel time to a location of the one or more calendar events.

19. The computer program product of claim 15, wherein targeting the user is accomplished using one or more random sensory effects or a random selection of remote devices.

20. The computer program product of claim 15, wherein the one or more sensory effects from the two or more remote devices increase in number or intensity over time.

\* \* \* \* \*